United States Patent
Satake

(10) Patent No.: US 7,963,688 B2
(45) Date of Patent: Jun. 21, 2011

(54) PORTABLE ELECTRONIC DEVICE

(75) Inventor: Kanji Satake, Yokohama (JP)

(73) Assignee: Kyocera Corporation, Kyoto (JP)

(*) Notice: Subject to any disclaimer, the term of this patent is extended or adjusted under 35 U.S.C. 154(b) by 290 days.

(21) Appl. No.: 12/423,673

(22) Filed: Apr. 14, 2009

(65) Prior Publication Data

US 2009/0266692 A1     Oct. 29, 2009

(30) Foreign Application Priority Data

Apr. 24, 2008 (JP) ................. 2008-114317
May 28, 2008 (JP) ................. 2008-139960

(51) Int. Cl.
*F21V 7/04* (2006.01)
(52) U.S. Cl. .......... 362/616; 362/88; 362/602; 362/615; 362/617; 362/621
(58) Field of Classification Search ................. 362/253, 362/269, 602–603, 615–617, 621, 800, 24, 362/27, 88, 577; 379/441
See application file for complete search history.

(56) References Cited

FOREIGN PATENT DOCUMENTS

JP     2007-184676     7/2007

*Primary Examiner* — Stephen F Husar
*Assistant Examiner* — Meghan K Dunwiddie
(74) *Attorney, Agent, or Firm* — DLA Piper LLP (US)

(57) ABSTRACT

The present invention has a configuration is one example in which a second body is connected to be rotatable around a rotational axis to a first body. A light emitting element that emits light and a first light guiding member, which propagates light emitted from the light emitting element as well as irradiating light from an irradiating unit, are housed in the first body. A light receiving element that receives light and a second light guiding member, which lets in light from the light collecting portion irradiated by the irradiating unit as well as propagates light in the light receiving element, are housed in the second body. Complimentary location regions of the irradiating units and light collecting portions are multiply provided between the first light guiding member and the second light guiding member, thereby multiply forming propagating paths of light from the irradiating units to the light collecting portions, respectively.

20 Claims, 13 Drawing Sheets

PORTABLE ELECTRONIC DEVICE

INCORPORATION BY REFERENCE

The present application claims foreign priority based on Japanese Patent Application No. 2008-114317 filed Apr. 24, 2008 and No. 2008-139960 filed May 28, 2008 each of the contents of which is incorporated herein by reference in its entirety.

BACKGROUND OF THE INVENTION

1. Field of the Invention

The present invention relates to a portable electronic device such as a cellular phone.

2. Related Art

In Japanese Unexamined Patent Application Publication No. 2007-184676, it has been proposed to perform transmission and reception (communication) of signals between a first body and a second body by an optical cable in a cellular phone which connects the first body and the second body.

However, regarding the cellular phone described in Japanese Unexamined. Patent Application Publication No. 2007-184676, in a case in which the number of light receiving elements disposed in the second body that corresponds to a single light emitting element disposed in the first body is one, reliability of receiving light, i.e. reliability of signal communication, tends to be decreased, for example, by dislocation between the first body and the second body caused by long-term use. This tendency also may be caused in a portable electronic device other than the cellular phone.

SUMMARY OF THE INVENTION

Accordingly, it is an object of the present invention to provide a portable electronic device that can more reliably perform signal communication by way of propagating light from a light emitting element to a light receiving element between a first body to a second body.

In an aspect of the present invention, a portable electronic device of the present invention includes: a first body; a second body connected to the first body so as to be transformable from a first state in which the second body is superimposed with the first body to second state, which is different thereto; a light emitting element that is housed in the first body, and emits light; a first light guiding member that is housed in the first body, and includes a first propagating path for propagating light emitted from the light emitting element and an irradiating unit for irradiating the light; a light receiving element that is housed in the second body, and receives light; a second light guiding member that is housed in the second body, and includes a light collecting portion for letting in light irradiated by the irradiating unit and a second propagating path for propagating light let in from the light collecting portion to the light receiving element; and a complementary location region of the irradiating unit and the light collecting portion that communicates a light signal between the first light guiding member and the second light guiding member in both the first state and the second state.

BRIEF DESCRIPTION OF THE DRAWINGS

The nature of this invention, as well as other objects and advantages thereof, will be explained in the following with reference to the accompanying drawings, in which like reference character designate the same or similar parts throughout the figures and wherein;

FIG. 3A shows an operation body unit from a front face side and FIG. 3B shows a display unit body from a front face side;

FIG. 10A is a sectional view (corresponding to FIG. 4), FIG. 10B is a diagram of a first light guiding member as seen from an irradiating unit side, and FIG. 10C is a diagram of a second light guiding member as seen from a light collecting portion side;

FIG. 13A is a first state of a slider-type cellular phone in which an operation unit body and a display unit body thereof are closed, and FIG. 13B is a second state of the slider-type cellular phone in which an operation unit body and a display unit body thereof are opened.

DETAILED DESCRIPTION OF THE INVENTION

Figure 1:
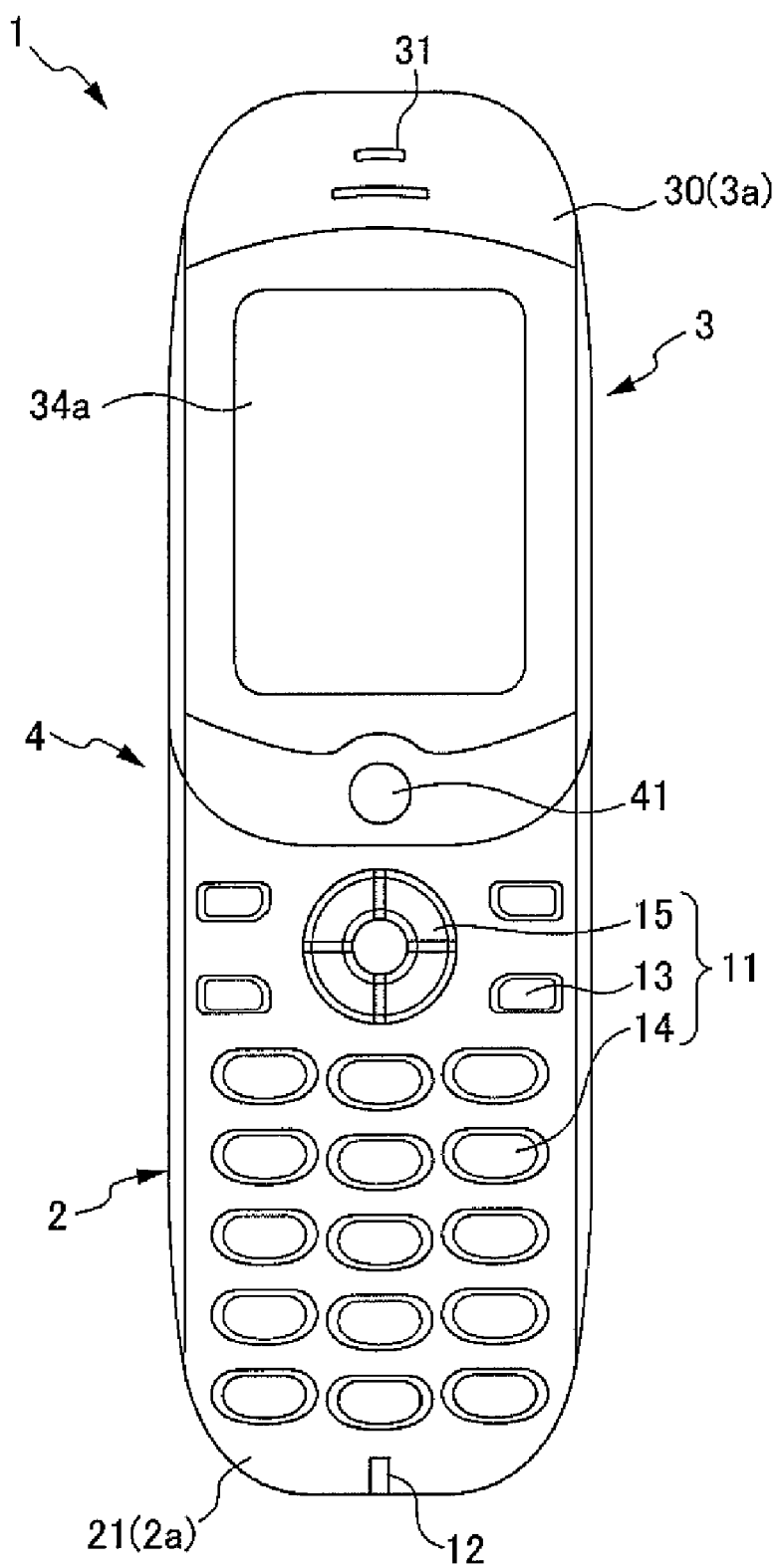
FIG. 1 is a front view showing a cellular phone, which is a first embodiment of the present invention, in a state in which an operation unit body and a display unit body thereof are opened.
Figure 2:
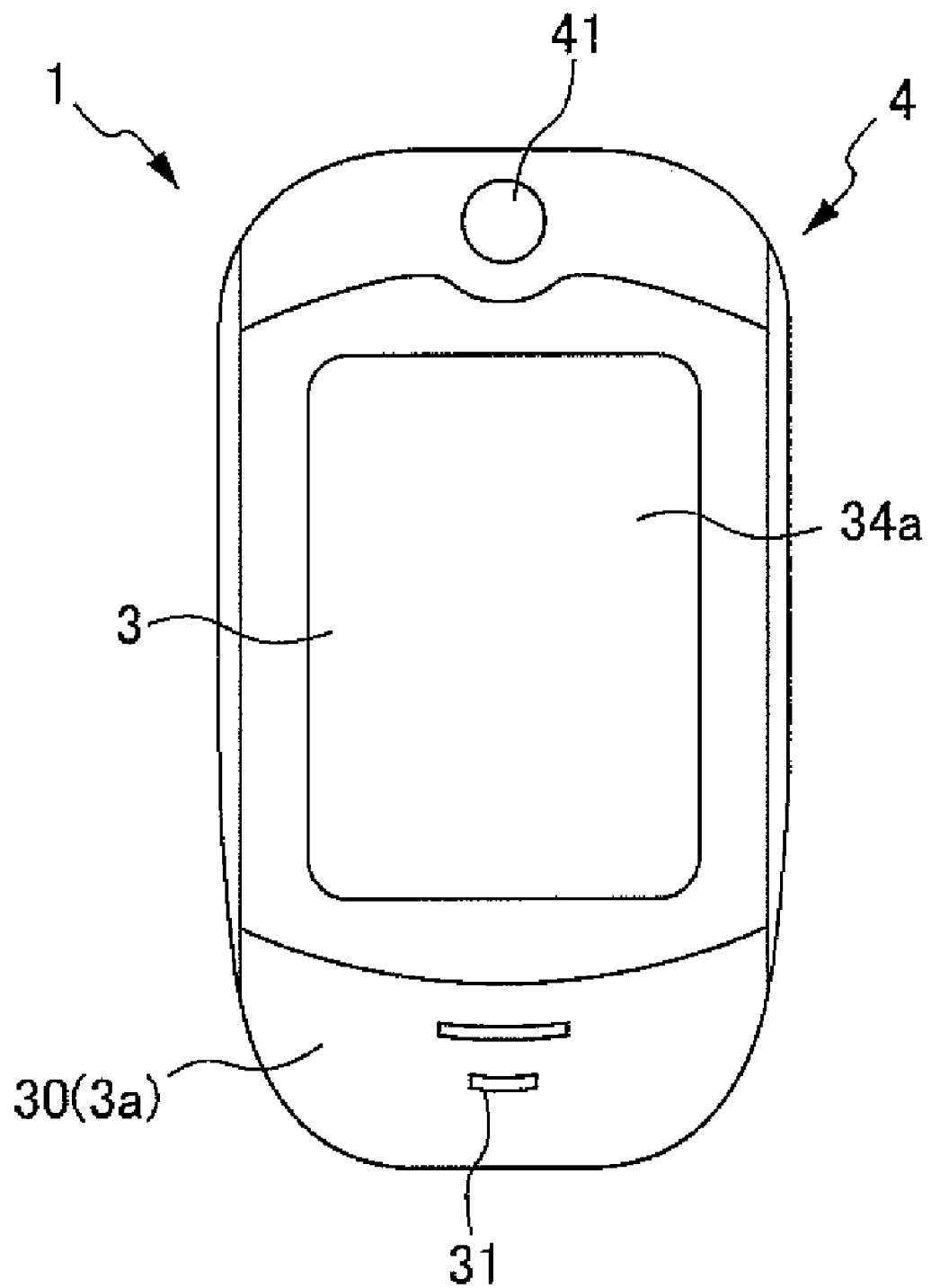
FIG. 2 is a front view showing the cellular phone shown in FIG. 1 in a state in which an operation unit body and a display unit body thereof are closed.

FIG. 1 is a front view showing a cellular phone 1, which is a first embodiment of the present invention, in a state in which an operation unit body 2 and a display unit body 3 thereof are opened. FIG. 2 is a front view showing a cellular phone 1 shown in FIG. 1 in a state in which an operation unit body 2 and a display unit body 3 thereof are closed.

As shown in FIGS. 1 and 2, the cellular phone 1 of the first embodiment includes the operation unit body 2 (a first body) and the display unit body 3 (a second body). The cellular phone 1 of the present embodiment is a so-called rotating-type (a revolver-type) cellular phone 1, and it can rotate one body around a rotational axis 41 which extends in a superimposed direction of the operation unit body 2 and the display unit body 3. Thus, an upper end portion of the operation unit body 2 and a lower end portion of the display unit body 3 are connected to be rotatable around the rotational axis 41 via a connection unit 4 including the rotational axis 41.

Therefore, the cellular phone 1 of the present embodiment is configured so that it is possible to move the operation unit body 2 and the display unit body 3 relatively, which are connected via the connection unit 4. More specifically, the cellular phone 1 is configured so that the operation unit body 2 and the display unit body 3 are transformable between the opened state (see FIG. 1) and the closed state (see FIG. 2). The closed state refers to a state in which a front face 2a of the operation unit body 2 and a back face 3b of the display unit body 3 (see FIG. 4) are superimposed on each other. The opened state refers to states other than the closed state.

As shown in FIGS. 1 and 2, an outer face of the operation unit body 2 is configured with a front casing 21, which forms a front face 2a side, and a rear casing (not shown), which forms a back face side. The operation unit body 2 is configured so that an operation key group 11 and a sound input portion 12 as a microphone, into which sounds a user of the cellular phone 1 produces during a telephone call are inputted, are exposed outside, respectively.

The operation key group 11 is configured with a function setting operation key 13 that operates various settings and various functions such as an address book function and mail function, an input operation key 14 for inputting numbers such as of a telephone number and characters in mail, and a determining operation key 15 as an operation member that, for example, determines various operations and performs scrolling in a right and left or up and down direction.

For each key that configures the operation key group 11, a predetermined function is assigned corresponding to opened and closed states of the operation unit body 2 and the display unit body 3, various modes, or types of applications and the like activated (key-assign). Then, an operation corresponding to a function assigned to each of the keys is performed by a user pressing each of the keys.

The sound input portion 12 is provided at an outer edge side, which is opposite to the connection unit 4 side in the longitudinal direction of the operation unit body 2. That is, the sound input portion 12 is provided at one outer edge side in the opened state of the cellular phone 1.

Figure 4:
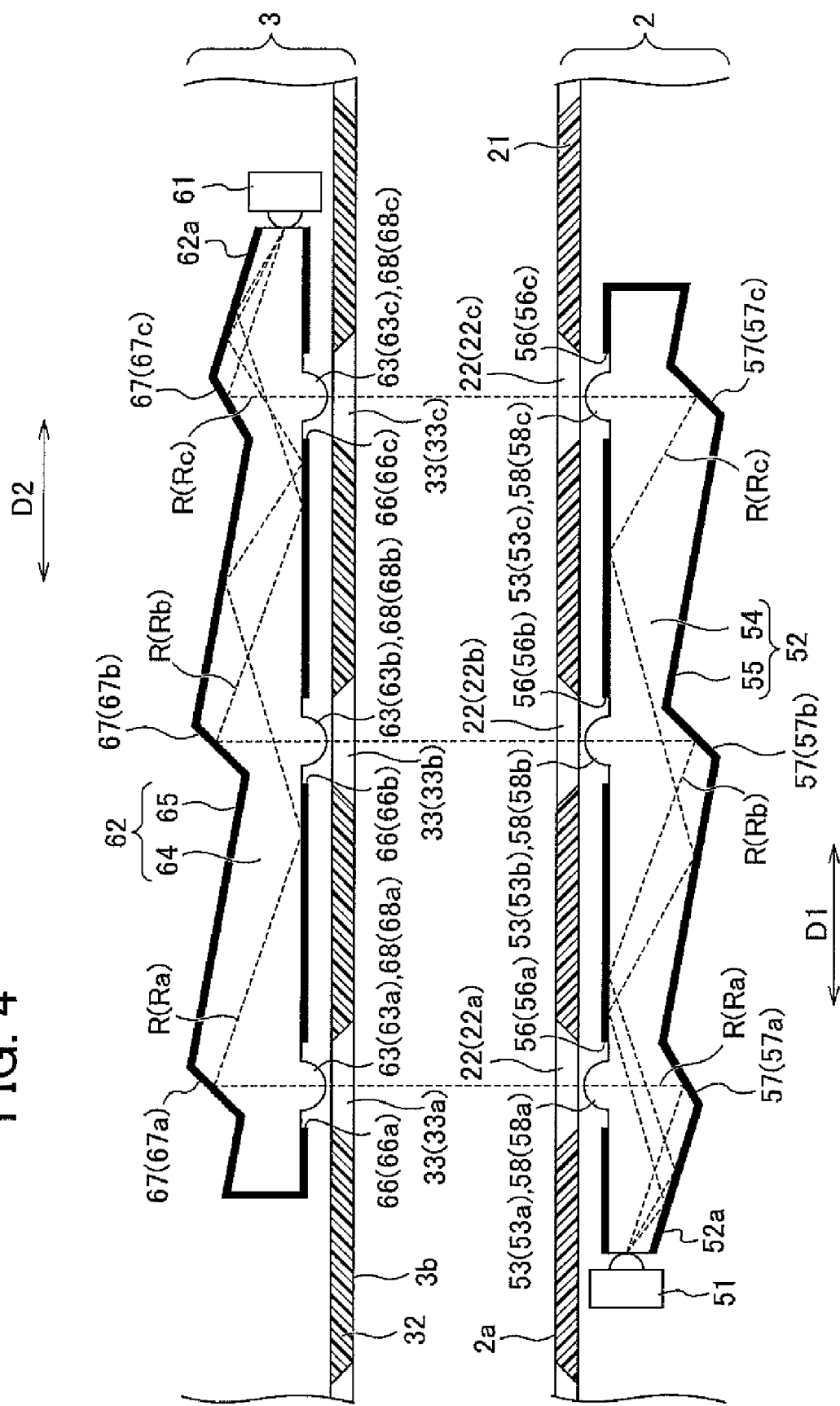
FIG. 4 is a diagram schematically showing a configuration regarding the propagation of light in a cellular phone shown in FIGS. 3A and 3B, and is a schematic cross-sectional diagram showing a state in which a first light guiding member of an operation body unit and a second light guiding member of a display unit body are virtually expanded to be linear along an extending direction thereof.

The outer face of the display unit body 3 is configured with a front casing 30, which forms a front face 3a side, and a rear casing 32, which forms a back face side 3b (see FIG. 4). The display unit body 3 is configured to be arranged so that a main display unit 34a for displaying a variety of information and a sound output portion 31 as a receiver for outputting voices from another party on a cellular phone are disposed so as to be exposed on the front casing 30 side.

Next, a configuration regarding the propagation of light between the operation unit body 2 and the display unit body 3 is described with reference to FIGS. 3 and 4.

It should be noted that, in FIG. 3, for convenience of understanding, a first light guiding member 52 at the operation unit body 2, a second light guiding member 62 at the display unit body 3, and the like are shown by solid lines, and the operation unit body 2, the display unit body 3, and the like are shown by dot-dot-dash lines. In addition, each of the first light guiding member 52 and the second light guiding member 62 are shown to be enlarged with respect to the operation unit body 2 and the display unit body 3.

As shown in FIGS. 3 and 4, a light emitting element 51 and the first light guiding member 52 are housed in the operation unit body 2.

The light emitting element 51 is an element for emitting a light R, and a semiconductor device, which emits a light upon applying a voltage, is generally used as the device.

The first light guiding member 52 propagates the light R emitted from the light emitting element 51 and irradiates the light from the irradiating portion 53.

A light receiving element 61 and a second light guiding member 62 are housed in the display unit body 3.

The light receiving element 61 is an element for receiving a light and, for example, the element includes a light sensor.

The second light guiding member 62 is a member that lets in the light R from a light collecting portion 63 irradiated by the irradiating portion 53, as well as propagates the light R to the light receiving element 61.

Furthermore, in the present embodiment, complementary location regions of the irradiating portion 53 (53a to 53c) and the light collecting portion 63 (63a to 63c), which transmit light signals, are multiply provided, and propagating paths of light from the irradiating portion 53 to the light collecting portion 63 are multiply provided, between the first light guiding member 52 and the second light guiding member 62.

It should be noted that the first light guiding member 52 and the second light guiding member 62, regarding points having similar configurations, are described in detail concerning the first light guiding member 52, and points differing with the first light guiding member 52 are described focusing on the second light guiding member 62.

In addition, in the present invention, as described later, a light emitting/receiving element that has both a light emitting function and light receiving function can be used as the light emitting element 51 or the light receiving element 61. In addition, the light can be propagated from the first light guiding member 52 of the operation unit body 2 to the second light guiding member 62 of the display unit body 3, and vice versa.

In particular, here an embodiment in which the light emitting element 51 is provided at the operation unit body 2 and the light receiving element 61 is provided at the display unit body 3, and the light R emitted from the light emitting element 51 is received at the light receiving element 61 via the first light guiding member 52 of the operation unit body 2 and the second light guiding member 62 of the display unit body 3, is described with reference to FIGS. 5 to 8.

The display unit body 3 is configured so that, in a case of rotating thereof around the rotational axis 41 with respect to the operation unit body 2, a rotation angle of the display unit body 3 with respect to the operation unit body 2 is held to the operation unit body 2 at positions that substantially make integral multiples of a predetermined angle. In the present embodiment, as shown in FIGS. 5 to 8, the display unit body 3 is configured so that, in a case of rotating thereof around the rotational axis 41 from the closed state shown in FIG. 5, a rotation angle of the display unit body 3 with respect to the operation unit body 2 is held to the operation unit body 2 at positions that form integral multiples of 90 degrees (90, 180, and 270 degrees). The configuration that maintains the display unit body 3 to the operation unit body 2 is not particularly limited, and various holding means can be utilized therefor.

Figure 3A:
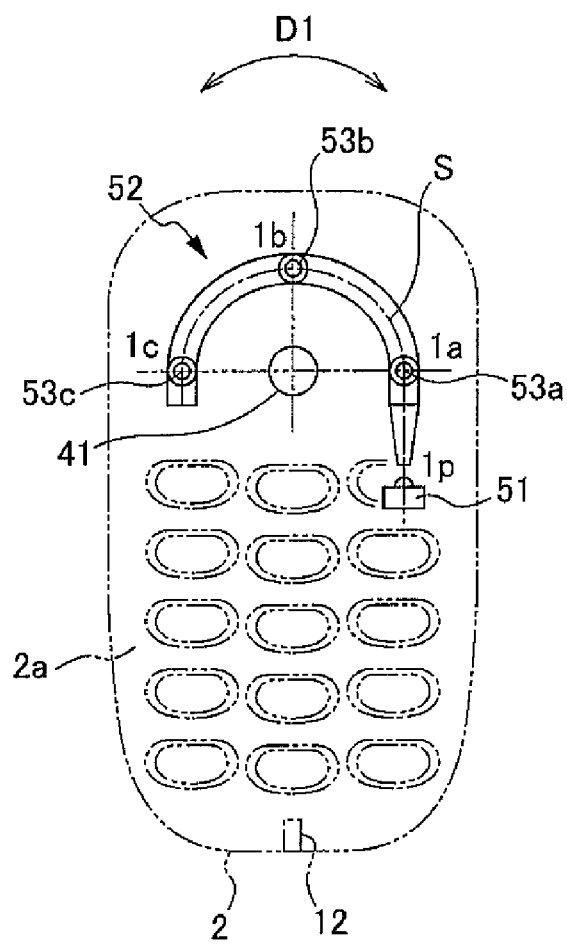
FIGS. 3A and 3B respectively are diagrams schematically showing configurations regarding the propagation of light in a cellular phone shown in FIG. 1, where
Figure 3B:
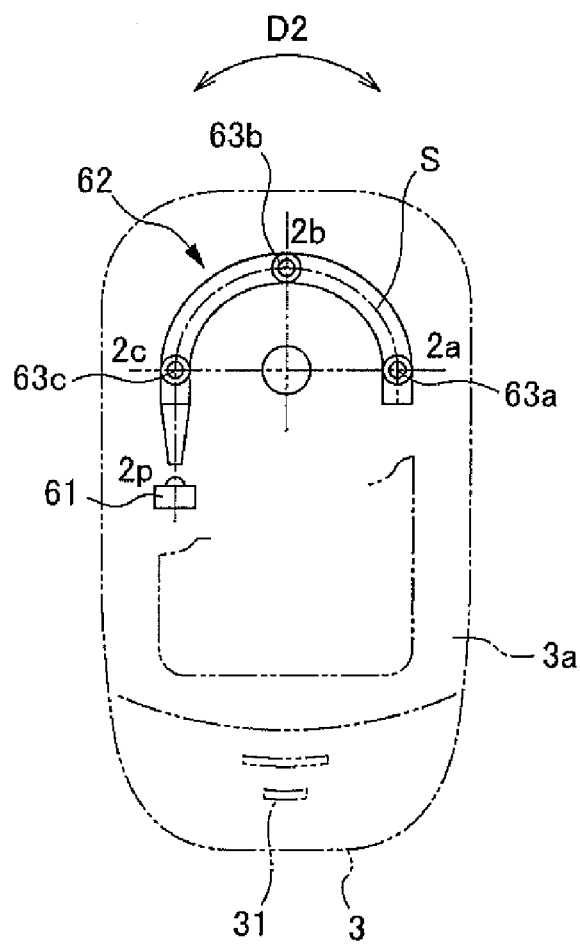

As shown in FIG. 3A, the first light guiding member 52 extends, on the operation unit body 2, substantially in a semicircular arc shape around the rotational axis 41. Furthermore, as shown in FIG. 3B, the second light guiding member 62 extends, on the display unit body 3, substantially in a semicircular arc shape with the rotational axis 41 as the center. It should be noted that, in FIG. 4, the first light guiding member 52 is virtually expanded to be linear along the extending direction D1, and the second light guiding member 62 is virtually extended to be linear along the extending direction D2.

The light emitting element 51 is disposed to be adjacent to one end portion 52a of the first light guiding member 52. Three irradiating portions 53 (53a, 53b, and 53c) are provided in the first light guiding member 52 from a side close to the light emitting element 51. The light receiving element 61 is disposed to be adjacent to one end portion 62a of the second light guiding member 62. Three light collecting portions 63 (63a, 63b, and 63c) are provided in the second light guiding member 62 from a side far from the light receiving element 61.

Each of the three irradiating portions 53 (53a, 53b, and 53c) is disposed to be spaced apart substantially at a predetermined angle (90 degrees) on a virtual circumference S formed around the rotational axis 41. Similarly, each of the three light collecting portions 63 (63a, 63b, and 63c) is disposed to be spaced apart substantially at a predetermined angle (90 degrees) on a virtual circumference S formed around the rotational axis 41.

Figure 5:
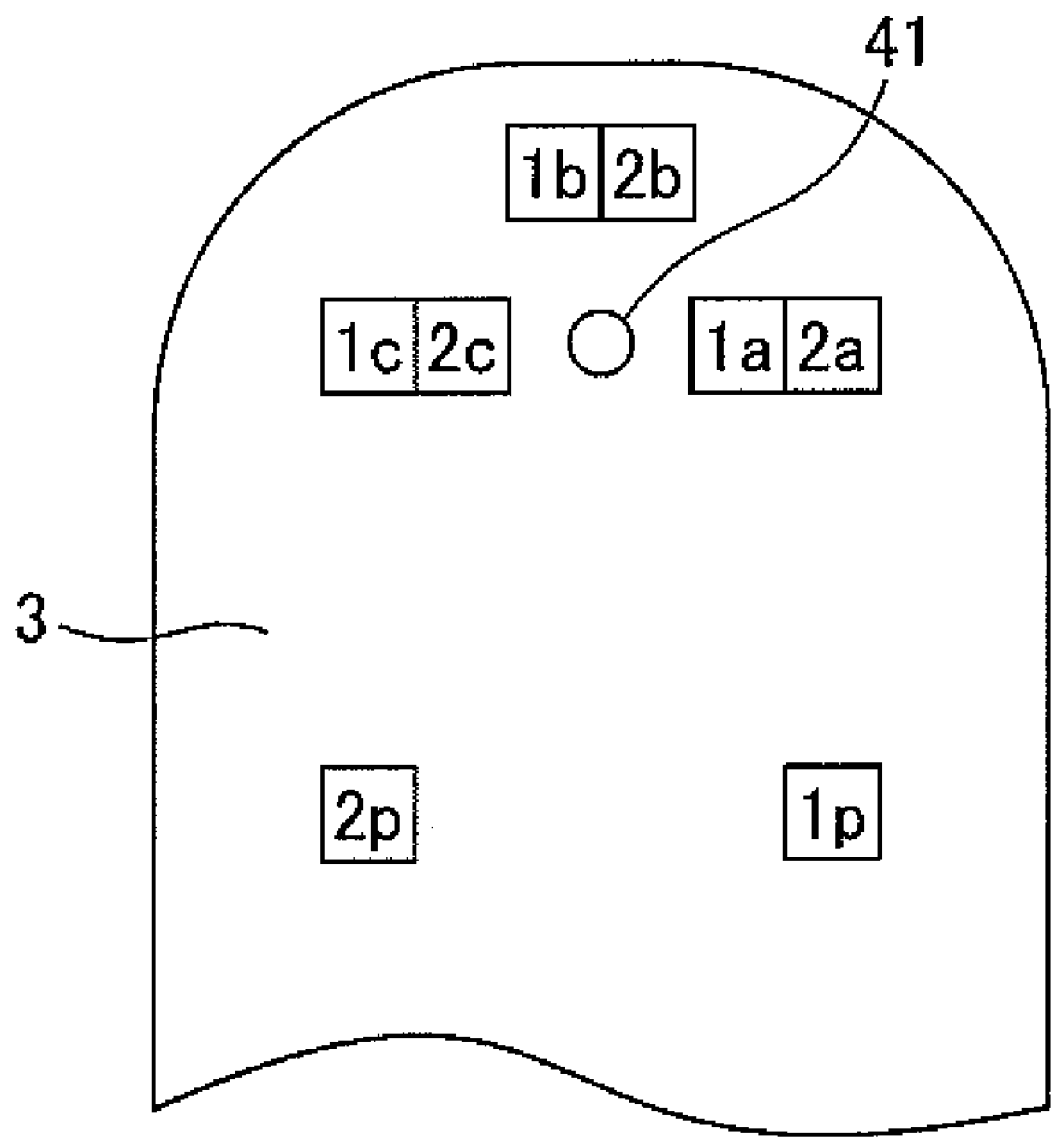
FIG. 5 is a diagram schematically showing the vicinity of a rotational axis of a cellular phone in a closed state (corresponding to FIG. 2)

Then, as shown in FIGS. 3 and 4, in the closed states shown in FIGS. 2 and 5, each of a plurality of the irradiating portions 53 mutually faces each of a plurality of the light collecting portions 63. More specifically, the three irradiating portions 53a, 53b, and 53c face with three light collecting portions 63a, 63b, and 63c, respectively.

As shown in FIG. 4, the first light guiding member 52 includes a first light transmissive member 54 and a first reflecting unit 55.

The first light transmissive member 54 includes a member which transmits light. For example, polymethylmethacrylate, glass, and the like can be exemplified as such a member.

The first reflecting unit 55 is formed, for example, so as to cover an outer surface of the first light transmissive member 54 surrounding the first light transmissive member 54 and can reflect light. Thus, light emitted from the light emitting element 51 can be propagated within the first light guiding member 52. The first reflecting unit 55 is not formed at a portion of the first light transmissive member 54 facing the light emitting element 51. The first reflecting unit 55 is composed of a metal film or a white polyester film, and is formed, for example, by way of deposition. Three first openings 56 (56a, 56b, and 56c) are provided in the first reflecting unit 55. Accordingly, three irradiating portions 53 (53a, 53b, and 53c) are formed from the first light transmissive member 54 which are exposed in this way.

It should be noted that, in a case in which a light is totally reflected and propagated through the first light guiding member 52 by an incident angle from the light emitting element 51, the first reflecting unit 55 may be solely provide at a first inclined portion 57, described later.

Furthermore, the first light transmissive member 54 has three first protruding portions 58 (58a, 58b, and 58c), which diffuse and irradiate light, at positions corresponding to the three first openings 56 (56a, 56b, and 56c) of the first reflecting unit 55. The irradiating portion 53 is formed from the first protruding portion 58. Similar to an LED lens, the first protruding portion 58, which diffuses and irradiates light, can collect the light in a predetermined area so as to irradiate thereof. The irradiating area of the light is preferably broader than a detecting area of the light collecting portion 63 of the corresponding second light transmissive member 64.

The first reflecting unit 55 includes a plurality (three) of the first inclined portion 57 (57a, 57b, and 57c). The first inclined portion 57 is inclined toward an extending direction D1 of the first light transmissive member 54 so that the light R emitted from the light emitting element 51 is directed to the irradiating portion 53. Each of the three irradiating portions 53 (53a, 53b, and 53c) is disposed to correspond to each of the first inclined portions 57 (57a, 57b, and 57c), respectively. Therefore, even in a case in which there is only one light emitting element 51, a light can be irradiated from a plurality of the irradiating portions 53.

Three first transmitting holes 22 (22a, 22b, and 22c) are provided at positions corresponding to the three irradiating portions 53 (53a, 53b, and 53c) in the front casing 21 of the operation unit body 2. Therefore, the irradiating portion 53 (the first protruding portion 58) is exposed to the front face 2a side of the operation unit body 2 via the first transmitting hole 22.

The second light guiding member 62 includes a second light transmissive member 64 and a second reflecting unit 65.

Similar to the first light transmissive member 54, the second light transmissive member 64 includes a member which transmits light.

The second reflecting unit 65 is formed, for example, so as to cover an outer surface of the second light transmissive member 64 surrounding the second light transmissive member 64 and can reflect light. Thus, a light from the light collecting portion 63 can be propagated within the second light guiding member 62. The second reflecting unit 65 is not formed at a portion of the second light transmissive member 64 facing the light receiving element 61.

The second reflecting unit 65 is composed of a metal film or a white polyester film, and is formed, for example, by way of deposition. Three second openings 66 (66a, 66b, and 66c) are provided at the second reflecting unit 65. Accordingly, three light collecting portions 63 (63a, 63b, and 63c) are formed based on portions of the second light transmissive member 64 which are exposed by providing the three second openings 65.

It should be noted that, in a case in which light from the light collecting portion 63 is propagated to the light receiving element 61, while being totally reflected in the second light guiding member 62, the second reflecting unit 65 may be provided at a second inclined portion 67 (described later) solely.

The second light transmissive member 64 has second protruding portions 68 (68a, 68b, and 68c), which collect light, at positions corresponding to the three second openings 66 (66a, 66b, and 66c) of the second reflecting unit 65. The light collecting portion 63 is formed from the second protruding portion 68. The second protruding portion 68 preferably has a convex lens shape.

The second reflecting unit 65 includes a plurality (3) of the second inclined portion 67 (67a, 67b, and 67c). The second inclined portion 67 is inclined toward an extending direction D2 of the second light transmissive member 64 so that the light R let in from the light collecting portion 63 is directed to the light receiving element 61. Each of the three light collecting portions 63 (63a, 63b, and 63c) is disposed to correspond to each of the second inclined portions 67 (67a, 67b, and 67c), respectively. Therefore, even in a case in which there is only one light receiving element 61, light can be let in from a plurality of the light collecting portions 63.

Three second transmitting holes 33 (33a, 33b, and 33c) are provided at positions corresponding to the three light collecting portions 63 (63a, 63b, and 63c) in the rear casing 32 of the display unit body 3. Therefore, the light collecting portion 63 (the second protruding portion 68) is exposed to the back face 3b side of the display unit body 3 via the second transmitting bore 33.

In the cellular phone 1 of the present embodiment, as shown in FIG. 4, the light R emitted from the light emitting element 51 is received at the light receiving element 61 in the closed state shown in FIG. 2.

More specifically, a light Ra emitted from the light emitting element 51 is transmitted in the first light transmissive member 54 of the first light guiding member 52. Then, the light Ra is reflected at the first inclined portion 57a of the first reflecting unit 55 and irradiated from the irradiating portion 53a. The light Ra irradiated from the irradiating portion 53a passes through the first transmitting hole 22a of the front casing 21 of the operation unit body 2 and the second transmitting hole 33a of the rear casing 32 of the display unit body 3. Then, the light Ra is let in at the light collecting portion 63a of the second light guiding member 62. The light Ra, which is let in at the light collecting portion 63a, is transmitted through the second light transmissive member 64. Then, the light Ra is reflected at the second inclined portion 67a of the second reflecting unit 65 and changes the direction thereof. Then, the light Ra further reflects again at the second reflecting unit 65, and is received at the light receiving element 61 through the second light transmissive member 64.

In addition, the light Rb emitted from the light emitting element 51 is transmitted in the first light transmissive member 54 of the first light guiding member 52. Then, the light Rb is reflected at the first inclined portion 57b of the first reflecting unit 55 after being reflected at the first reflecting unit 55, and is irradiated from the irradiating portion 53b. The light Rb irradiated from the irradiating portion 53b passes through the second transmitting hole 22b of the front casing 21 of the operation unit body 2 and the second transmitting hole 33b of the rear casing 32 of the display unit body 3. Then, the light Rb is let in at the light collecting portion 63b of the second light guiding member 62. The light Rb which is let in at the light collecting portion 63b is transmitted through the second light transmissive member 64. Then, the light Rb is reflected at the second inclined portion 67b of the second reflecting unit 65 and changes the direction thereof. Then, the light Rb further reflects again at the second reflecting unit 65, and is received at the light receiving element 61 through the second light transmissive member 64.

In addition, the light Rc emitted from the light emitting element 51 is transmitted in the first light transmissive member 54 of the first light guiding member 52. Then, the light Rc is reflected at the first inclined portion 57c of the first reflecting unit 55, and is irradiated from the irradiating portion 53c. The light Rc irradiated from the irradiating portion 53c passes through the first transmitting hole 22c of the front casing 21 of the operation unit body 2 and the second transmitting hole 33c of the rear casing 32 of the display unit body 3. Then, the light Rc is let in at the light collecting portion 63c of the second light guiding member 62. The light Rc, which is let in at the light collecting portion 63c, is transmitted through the second light transmissive member 64. Then, the light Rc is reflected at the second inclined portion 67c of the second reflecting unit 65 and changes the direction thereof. Then, the light Rc is received at the light receiving element 61 through the second light transmissive member 64.

Thus, in the present embodiment, in the closed state shown in FIG. 2, three pairs of complementary location regions are provided that are arranged to face the irradiating portions 53 (53a, 53b, and 53c) with the light collecting portions 63 (63a, 63b, and 63c), and three propagating paths for lights are formed that communicate light signals between the first light guiding member and the second light guiding member.

Next, a positional relationship between the tree irradiating portions 53 (53a, 53b, and 53c) of the operation unit body 2 and the three light collecting portions 63 (63a, 63b, and 63c) of the display unit body 3 is described in a case in which the display unit body 3 is rotated with respect to the operation unit body 2 around the rotational axis 41.

In FIGS. 5 to 8, positions corresponding to the three irradiating portions 53 (53a, 53b, and 53c) are shown as "1a", "1b", and "1c", respectively, and positions corresponding to the three light collecting portions 63 (63a, 63b, and 63c) are shown as "2a", "2b", and "2c", respectively. In addition, positions corresponding to the light emitting element 51 and the light receiving element 61 are shown as "1p" and "2p", respectively.

As shown in FIG. 5, in the closed state in which the operation unit body 2 is superimposed with the display unit body 3, a position 1a of the first irradiating portions 53a and a position 2a of the first light collecting portion 63a match. Furthermore, a position 1b of the second irradiating portion 53b and a position 2b of the second collecting portion 63b match, and a position 1c of the third irradiating portion 53c and a position 2c of the third collecting portion 63c match.

Accordingly, in the closed state shown in FIG. 5, three propagating paths of the light R from the irradiating portions 53 (53a, 53b, and 53c) to the light collecting portions 63 (63a, 63b, and 63c) are formed that communicate light signals between the first light guiding member 52 and the second light guiding member 62.

Figure 6:
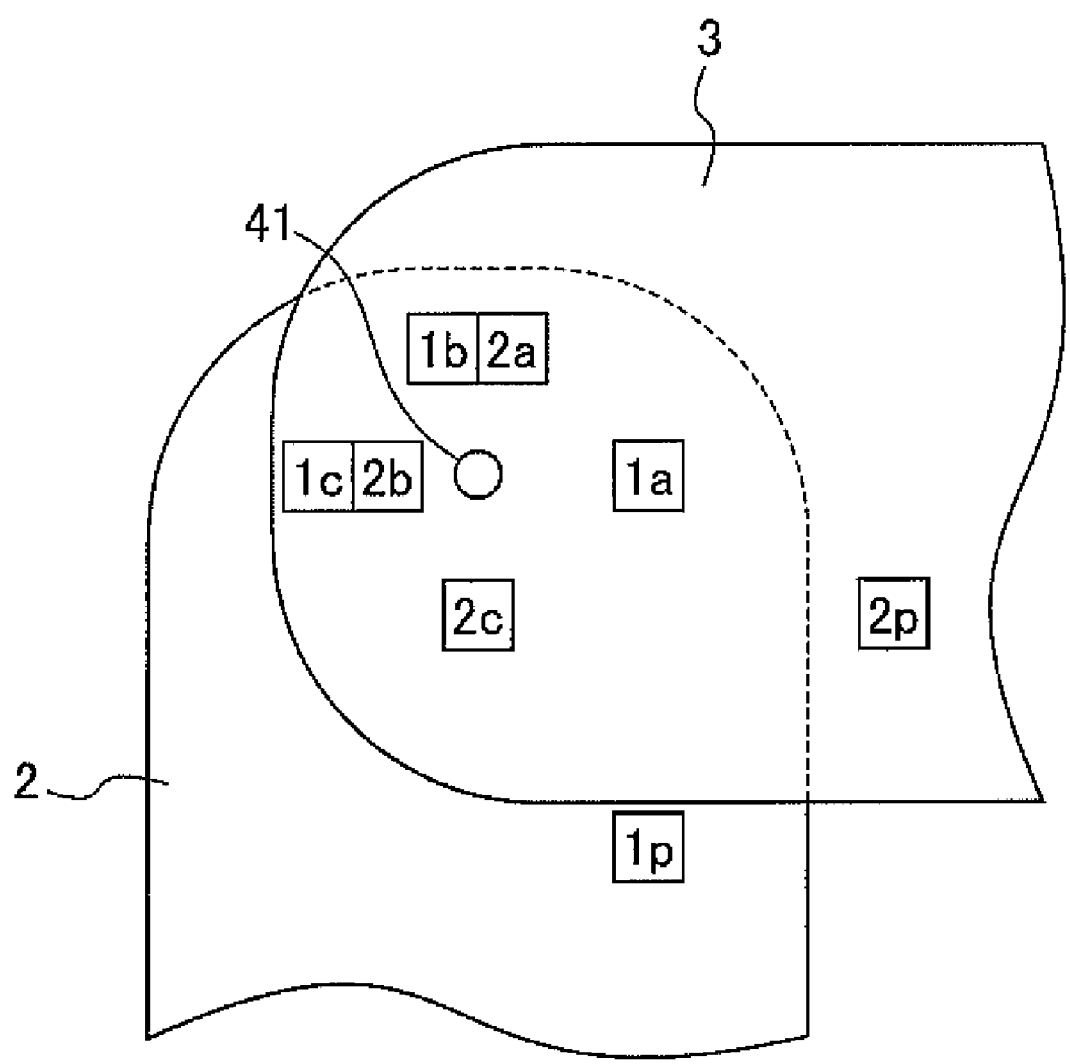
FIG. 6 shows a state in which a display unit body is rotated 90 degrees around a rotational axis in a counterclockwise direction with respect to an operation unit body.

As shown in FIG. 6, in a case in which the display unit body 3 is rotated 90 degrees in a counterclockwise direction with respect to the operation unit body 2 around the rotational axis 41, the position 1b of the second irradiating portion 53b and the position 2a of the first light collecting portion 63a are matched. Furthermore, the position 1c of the third irradiating portion 53c and the position 2b of the second light collecting portion 63b are matched. On the other hand, the position 1a of the first irradiating portion 53a and any position of the light collecting portion 63 do not match. Similarly, the position 2c of the third light collecting portion 63c and any position of the irradiating portion 53 do not match.

Accordingly, in the state shown in FIG. 6, two propagating paths of the light R from the irradiating portions 53 (53b and 53c) to the light collecting portions 63 (63b and 63c) are formed that communicate light signals between the first light guiding member 52 and the second light guiding member 62.

Figure 7:
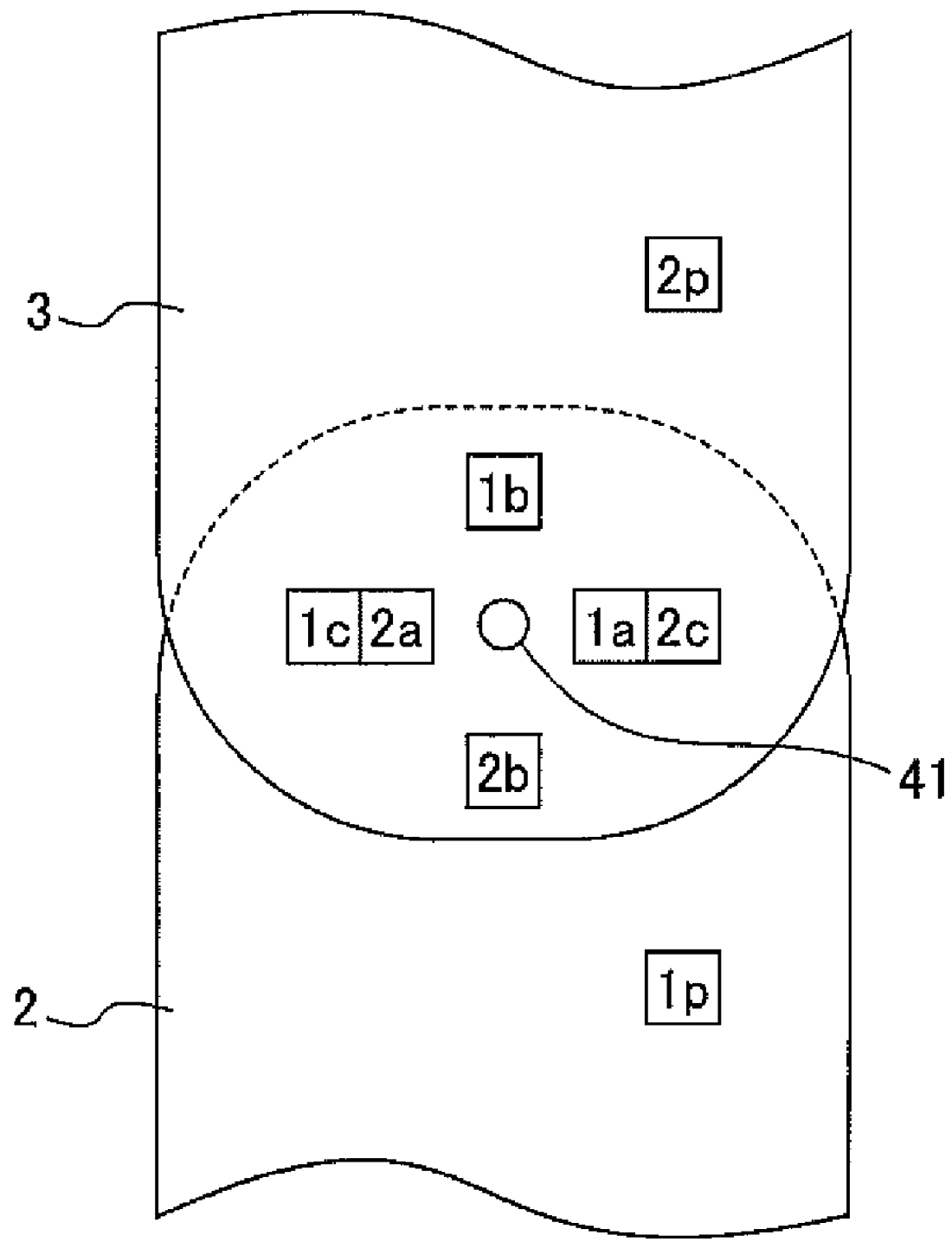
FIG. 7 shows a state in which a display unit body is rotated 180 degrees around a rotational axis with respect to an operation unit body.

As shown in FIG. 7, in a case in which the display unit body 3 is rotated 180 degrees with respect to the operation unit body 2 around the rotational axis 41, the position 1a of the first irradiating portion 53a and the position 2c of the third light collecting portion 63c match. Furthermore, the position 1c of the third irradiating portion 53c and the position 2a of the first light collecting portion 63a match. On the other hand, the position 1b of the second irradiating portion 53b and any position of the light collecting portion 63 do not match. Similarly, the position 2b of the second light collecting portion 63b and any position of the irradiating portion 53 do not match.

Accordingly, in the state shown in FIG. 7, two propagating paths of the light R from the irradiating portions 53 (53a and 53c) to the light collecting portions 63 (63c and 63a) are formed that communicate light signals between the first light guiding member 52 and the second light guiding member 62.

Figure 8:
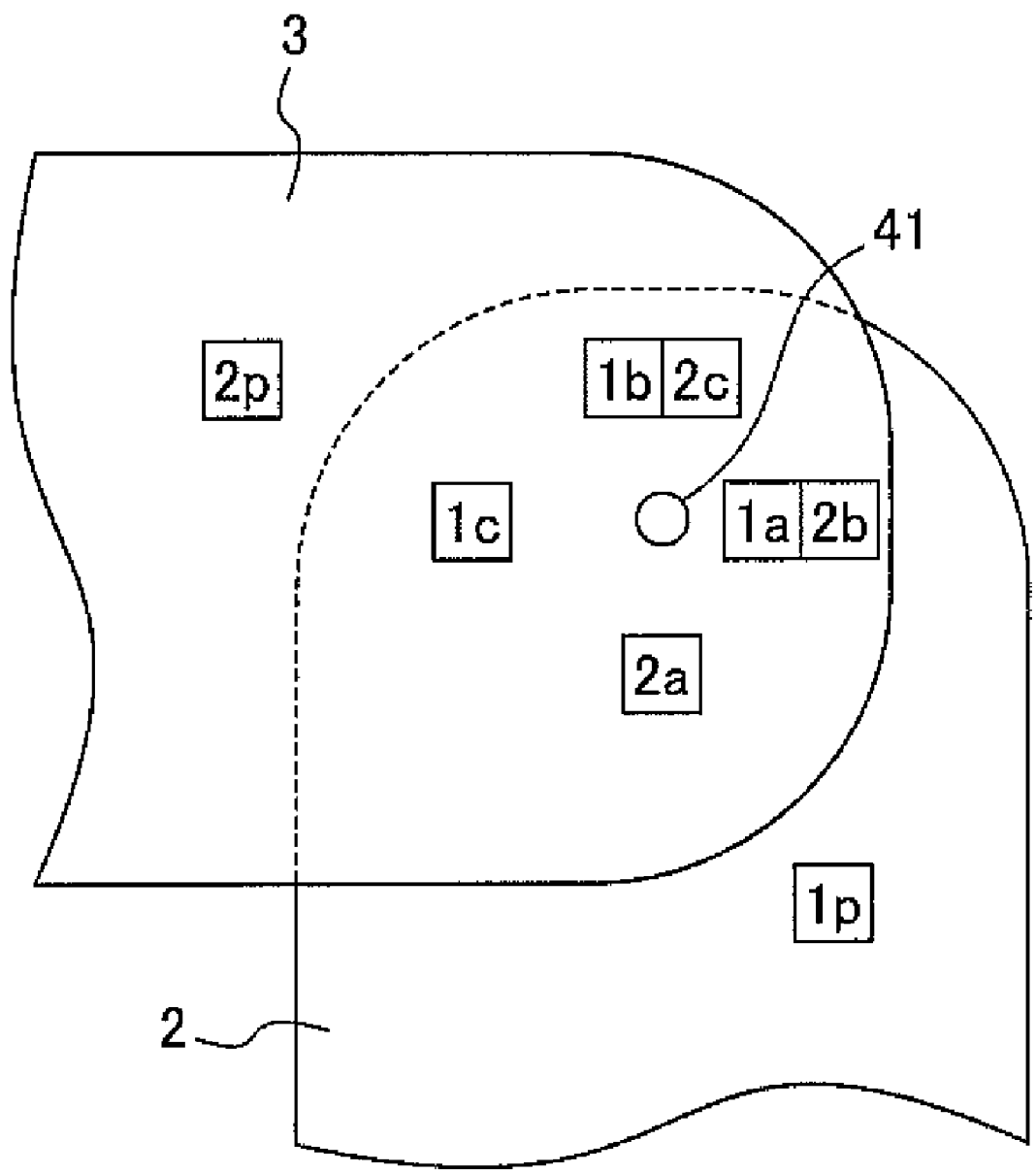
FIG. 8 shows a state in which a display unit body is rotated 270 degrees around a rotational axis in a counterclockwise direction with respect to an operation unit body.

As shown in FIG. 8, in a case in which the display unit body 3 is rotated 270 degrees around the rotational axis 41 in a counterclockwise direction with respect to the operation unit body 2, the position 1*a* of the first irradiating portion 53*a* and the position 2*b* of the second light collecting portion 63*b* match. Furthermore, the position 1*b* of the second irradiating portion 53*b* and the position 2*c* of the third light collecting portion 63*c* match. On the other hand, the position 1*c* of the third irradiating portion 53*c* and any position of the light collecting portion 63 do not match. Similarly, the position 2*a* of the first light collecting portion 63*a* and any position of the irradiating portion 53 do not match.

Accordingly, in the state shown in FIG. 8, two propagating paths of the light R from the irradiating portions 53 (53*a* and 53*b*) to the light collecting portions 63 (63*b* and 63*c*) are formed that communicate light signals between the first light guiding member 52 and the second light guiding member 62.

In addition, only in a case in which the display unit body 3 is arranged in the positions shown in FIGS. 5 to 8, the light R emitted from the light emitting element 51 is received at the light receiving element 61. That is, signal communications are performed by way of propagation of the light R. Therefore, signal communications are interrupted on the way of moving from one position of signal communication to another position of signal communication. In this case, in order to detect that the position of the display unit body 3 has been changed before the communication of light signals is interrupted, it is preferable that the position of the display unit body 3 is detected, for example, by using an encoder with better detection accuracy and comparing output differences between a plurality of sensors.

Alternatively, in a case in which the signal communication is interrupted, there may be a request made to a receiving side from a transmitting side so as to re-send a signal that was interrupted. Alternatively, in a case in which the position of the display unit body 3 was changed, for example, a method can be used which updates an immediately preceding image after storing the image data and detecting that the position has been fixed to a subsequent position. In addition, it is possible to display an image prepared by default on the display unit body 3.

In the present embodiment, complementary location regions of the irradiating portion 53 and the light collecting portion 63 are provided, and propagating paths of lights from the irradiating portion 53 to the light collecting portion 63 are multiply formed (two or three), between the first light guiding member 52 and the second light guiding member 62. Thus, in comparison with the case in which there is only one propagating path of light between the first light guiding member and the second light guiding member, the reliability of signal communication is improved by way of propagation of a light. For example, even in a case in which dust, dirt, and the like are adhered to one irradiating portion 53 or one light collecting portion 63, it is possible to communicate signals by way of propagating lights (light signals) through the complementary location regions of irradiating portions 53 and the other light collecting portions 63.

Furthermore, in the present embodiment, the irradiating portions 53 and the light collecting portions 63 are multiply provided, respectively. Therefore, without adding the light emitting element 51 and the light receiving element 61, it is possible to form a plurality of the propagating paths of the light R from the irradiating portions 53 to the light collecting portions 63 between the light emitting element 51 and the light receiving element 61.

In addition, in the present embodiment, in a case in which the display unit body 3 is rotated around the rotational axis 41 with respect to the operation unit body, the display unit body 3 is configured so that the rotation angle of the display unit body 3 with respect to the operation unit body 2 is held to the operation unit body 2 at positions that substantially make integral multiples of a predetermined angle (90 degrees). Then, a plurality of the irradiating portions 53 (53*a*, 53*b*, and 53*c*) and a plurality of the three light collecting portions 63 (63*a*, 63*b*, and 63*c*) are disposed to be spaced apart substantially at a predetermined angle (90 degrees) on a virtual circumference S around the rotational axis 41, respectively. Then, in a closed state in which the display unit body 3 is superimposed with the operation unit body 2, a plurality of the irradiating portions 53 (53*a*/53*b*, and 53*c*) mutually face each corresponding light collecting portion 63 (63*a*, 63*b*, and 63*c*).

Therefore, in a case in which the display unit body 3 is rotated with respect to the operation unit body 2 around the rotational axis 41 so as to arrange the display unit body 3 at position where the rotational angle of the display unit body 3 with respect to the operation unit body 2 substantially becomes an integral multiple of a predetermined angle (90 degrees), a plurality of the propagating paths of the light R from the irradiating portion 53 to the light collecting portion 63 can be formed between the first light guiding member 52 and the second light guiding member 62.

In addition, in the present embodiment, the first light guiding member 52 includes the first light transmissive member 54 through which light is transmitted and the first reflecting unit 55, which reflects the light R formed surrounding the first light transmissive member 54. Then, the irradiating portions 53 are formed based on the portions of the first light transmissive member 54 which are exposed by providing the first opening 56 at the first reflecting unit 55. Thus, it is unlikely to leak the light R from the first light guiding member 52.

In addition, in the present embodiment, the first reflecting unit 55 includes a first inclined portion 57, which is inclined toward the extending direction D1 of the first light transmissive member 54 so that the light R emitted from the light emitting element 51 is directed to the irradiating portion 53. Then, the irradiating portion 53 is disposed to correspond to the first inclined portion 57. Therefore, the light R that is propagated in the first light guiding member 52 can be reflected at the first inclined portion 57 and effectively irradiated to outside of the first light guiding member 52 from the irradiating portion 53.

In addition, in the present embodiment, the first light transmissive member 54 has the first protruding portions 58, which diffuses and irradiates light, at a position corresponding to the first opening 56 of the first reflecting unit 55. Then, the irradiating portion 53 is formed from the first protruding portion 58. Therefore, the light R is diffused by the first protruding portion 58, which can broaden the irradiation angle of the light R irradiated from the first light guiding member 52. Consequently, even though there may be a case where the position at which the irradiating portion 53 and the light collecting portion 63 are facing is slightly dislocated, the propagating path of the light R can be easily maintained.

In addition, in the present embodiment, the second light guiding member 62 includes the second light transmissive member 64 through which light is transmitted and the second reflecting unit 65 which reflects the light formed surrounding the second light transmissive member 64. Then, the light collecting portion 63 is formed from the second light transmissive member 64, which is exposed by providing the second opening 66 at the second reflecting unit 65. Thus, it is unlikely for light R to leak from the light transmissive member 64, and the light R can be reliably propagated in the first light guiding member 52.

In addition, in the present embodiment, the second reflecting unit 65 includes a second inclined unit 67 which is inclined toward the extending direction D2 of the second light transmissive member 64 so that the light R let in from the light collecting portion 63 is directed to the light receiving element 61, and the light collecting portion 63 is disposed to correspond to the second inclined portion 67. Therefore, the light R let in by the light collecting portion 63 can be reflected at the second inclined portion 67 and propagated more reliably to the light receiving element 61 via the second light transmissive member 64.

In addition, in the present embodiment, the second light transmissive member 64 has the second protruding portions 68, which collect light, at a position corresponding to the second opening 66 of the second reflecting unit 65. Then, the light collecting portion 63 is formed at the location of the second protruding portion 68. Therefore, since the light R irradiated from the irradiating portion 53 is collected by the light collecting portion 63, which is formed from the second protruding portion 68, the light R can be collected extensively. Consequently, even though there may be a case where the position at which the irradiating portion 53 and the light collecting portion 63 are facing is slightly dislocated, the propagating path of the light R can be easily maintained.

In the above, although the first embodiment of the present invention is described, the present invention is not limited thereto.

For example, in the first embodiment, although the operation unit body 2 is the first body (i.e. the light emitting element 51 is provided to the operation unit body 2) and the display unit body 3 is the second body (i.e. the light receiving element 61 is provided to the display unit body 3), the present invention is not limited thereto. The operation body unit 2 may be the second body (i.e. the light receiving element 61 is provided to the operation unit body 2) and the display unit body 3 may be the first body (i.e. the light emitting element 51 is provided to the display unit 3).

In addition, a light emitting/receiving element having both a light emitting function and a light receiving function can be used instead of the light emitting element 51 or the light receiving element 61. In this case, the light emitted from the light emitting/receiving element of the operation unit body 2 can be received at the light emitting/receiving element of the display unit body 3, and the light emitted from the light emitting/receiving element of the display unit body 3 can be received at the light emitting/receiving element of the operation unit body 2. It should be noted that, in order to secure a condition in which there is no interruption by lights emitted or received in a case of using a light emitting/receiving element, processing can be employed which eliminates the interruption by way of subtraction processing for the light emitted.

Figure 9:
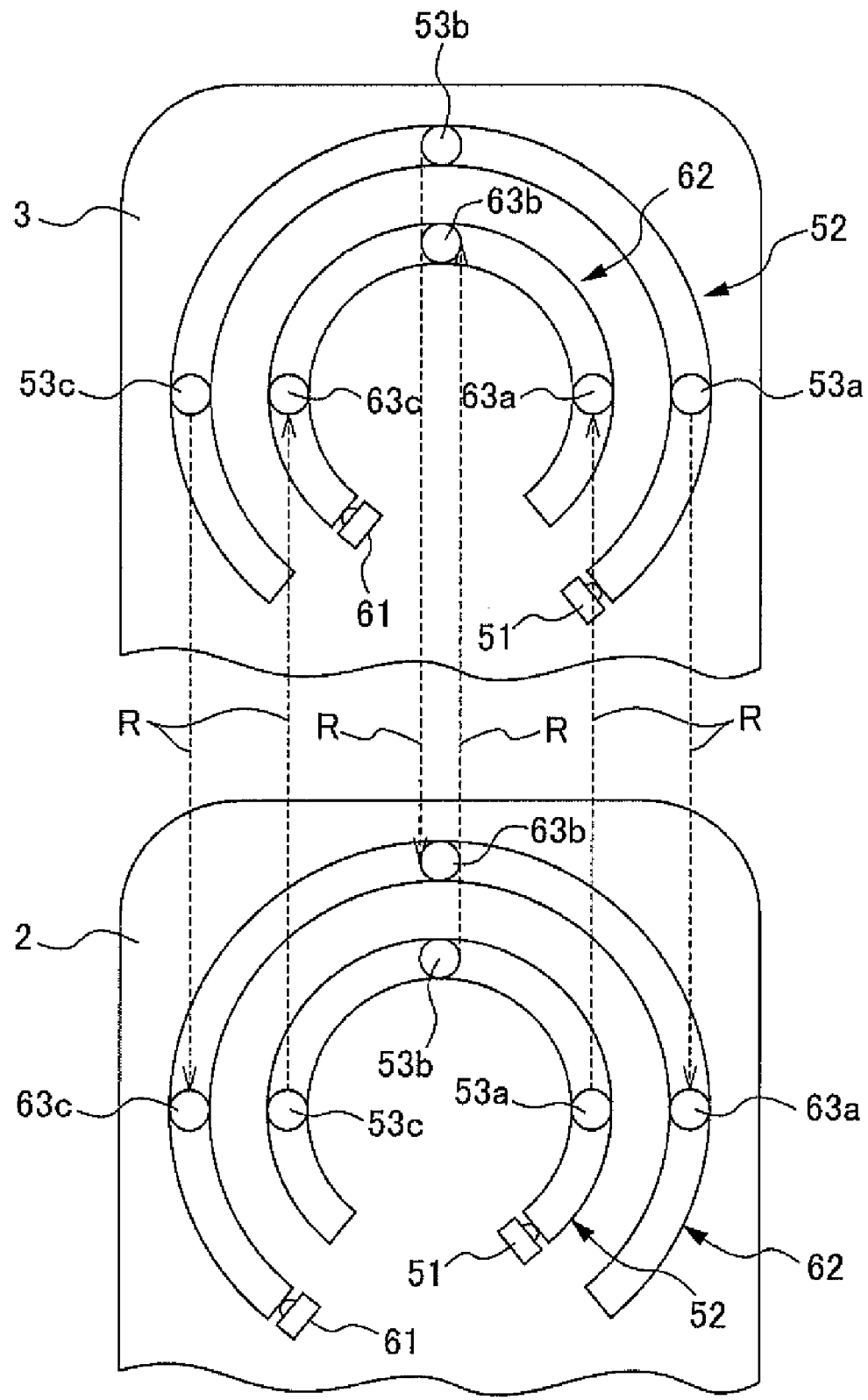
FIG. 9 is an enlarged main component diagram that schematically shows corresponding relationships between each irradiating unit and each light collecting portion in a case of communicating signals between a display unit body and an operation unit body, according to a second embodiment.

Instead of a light emitting/receiving element, both the light emitting element 51 and the light receiving element 61 may be provided to both the operation unit body 2 and the display unit body 3. In this case, the light emitted from the light emitting element 51 of the operation unit body 2 can be received at the light receiving element 61 of the display unit body 3, and the light emitted from the light receiving element of the display unit body 3 can be received at the light receiving element of the operation unit body 2. In this case, as shown in FIG. 9, a set of the light emitting element 51 and the first light guiding member 52 may be arranged in one side and the other side of the body 2 and the body 3, respectively. In addition, a corresponding set of the light receiving element 61 and the second light guiding member 62 may be similarly arranged in the body 2 and the body 3, respectively. It should be noted that the configuration shown in FIG. 9 is called a "second embodiment" in the following.

Although the predetermined angle of the adjacent irradiating portions 53 and the predetermined angle of the plurality of the adjacent light collecting portions 63 are 90 degrees in the first and second embodiment, the present invention is not limited thereto, and it may be, for example, 30 degrees, 45 degrees, or 180 degrees. Four or more irradiating portions 53 and light collecting portions 63 can be provided depending on the size of the predetermined angle. In addition, in a case in which the predetermined angle is 90 degrees, three irradiating portions 53 and three light collecting portions 63 may be sufficient to include at least two or more propagating paths of lights. Four irradiating portions 53 and three light collecting portions 63 may be sufficient to include three or more propagating paths of light.

Figure 10A:
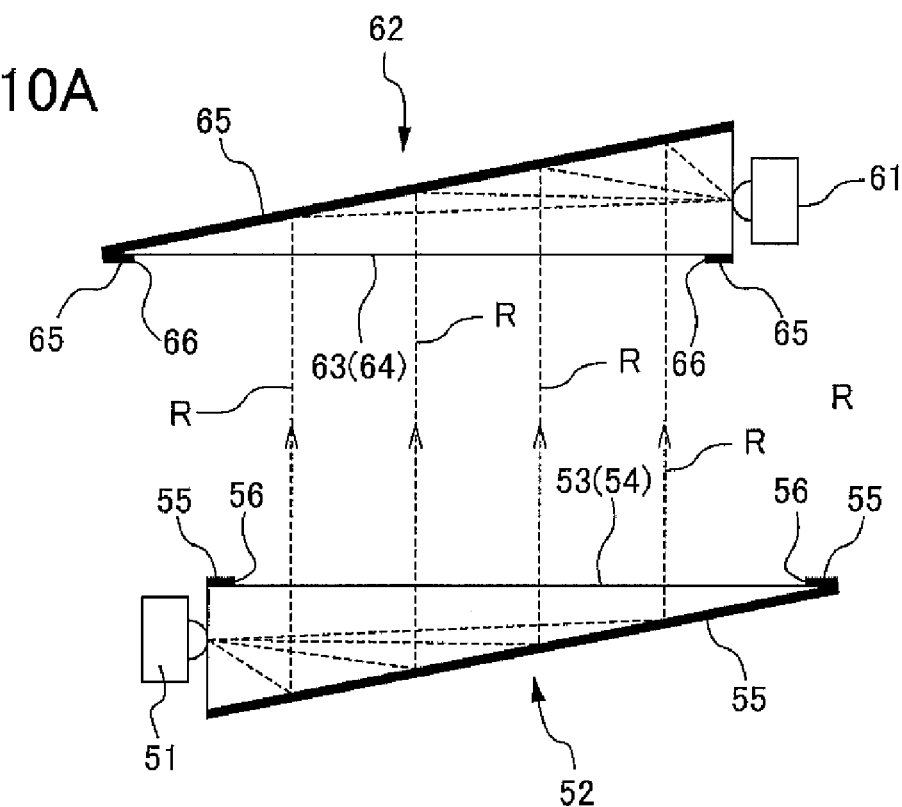
FIGS. 10A to 10C respectively are schematic diagrams showing a state in which a first light guiding member and a second light guiding member are virtually expanded to be linear along an extending direction thereof, where
Figure 10B:
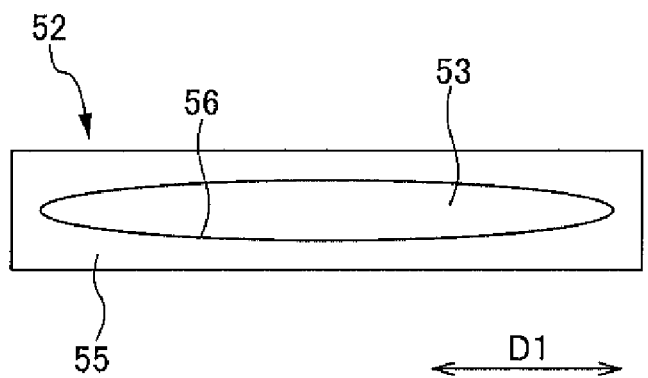
Figure 10C:
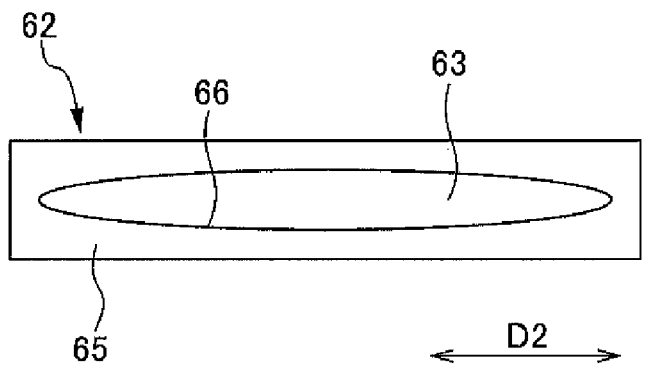

In addition, as shown in FIGS. 10A to 10C, compared to the first embodiment, a irradiating portion 53 and a light collecting portion 63 which extend in circular arc shapes along the extending direction D1 of the first light guiding unit 52 and the extending direction D2 of the second light guiding member 62 can be employed as the irradiating portion 53 and the light collecting portion 63 (the same numbers as those in the first embodiment are used for reference numerals). An irradiating portion 53 extending in a circular arc shape as described above can be formed, for example, by providing the first opening 56 at the first reflecting unit 55 so as to extend along the extending direction D1 of the first light guiding member 52. Similarly, a light collecting portion 63 extending in a circular arc shape can be formed, for example, by providing the second opening 66 at the second reflecting unit 65 so as to extend along the extending direction D2 of the second light guiding member 62.

In this configuration as well, complementary location regions of a circular arc shape of the irradiating portion 53 and the light collecting portion 63, which communicate through light signals, are provided between the first light guiding member 52 and the second light guiding member 62, thereby forming propagating paths of light from the irradiating portion 53 to the light collecting portion 63. The propagating path of light for this case is a propagating path of light with a linear shape or a sheet shape, corresponding to the complementary location region with a circular arc shape.

Figure 11:
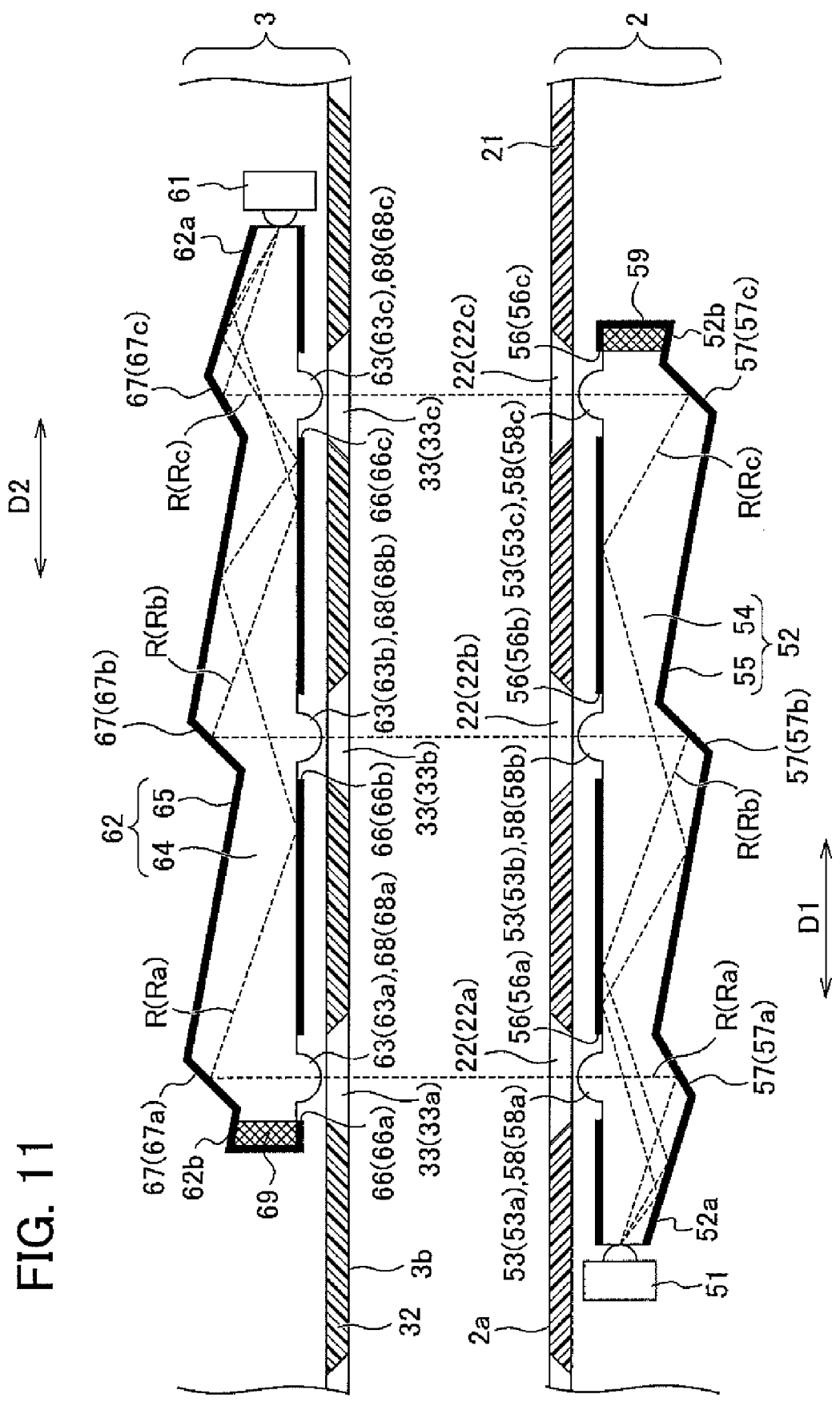
FIG. 11 is a diagram schematically showing a configuration regarding propagation of light in a cellular phone according to a third embodiment (corresponding to FIG. 4), and is a schematic cross-sectional diagram showing a state in which a first light guiding member of an operation body unit and a second light guiding member of a display unit body are virtually expanded to be linear along an extending direction thereof.

Next, a third embodiment having a portion of the configuration thereof that is different from the first embodiment is described with reference to FIG. 11. FIG. 11 is a diagram schematically showing a configuration regarding propagation of light in the cellular phone 1 according to the third embodiment (corresponding to FIG. 4), and more specifically, is a schematic cross-sectional diagram showing that the first light guiding member 52 of the operation body unit 2 and the second light guiding member 62 of the display unit body 3 are expanded linearly.

The third embodiment is mainly different from the first embodiment in that the first light absorbing member 59 is provided at the first light guiding member 52 and the irradiating portion 53c, which is farthest from the light emitting element 51 among a plurality of the irradiating portions 53 (53a, 53b, and 53c), is provided to be adjacent to the end portion 52b of the first light guiding member 52, and in that a second absorbing member 69 is provided at the second light guiding member 62 and the light collecting portion 63a, which is farthest from the light receiving element 61 among a plurality of the light collecting portions 63 (63a, 63b, and 63c), is provided to be adjacent to the end portion 62b of the second light guiding member 62.

Concerning the third embodiment, points different from the first embodiment are mainly described, and the same reference numerals are assigned to configurations similar to the first embodiment, and the explanations therefor are omitted. Regarding points that are not specifically described with respect to the third embodiment, explanations for the first embodiment are applied thereto as appropriate.

As shown in FIG. 11, similar to the first embodiment, in the third embodiment, the light emitting element 51 is disposed to be adjacent to one end portion 52a in the extending direction D1 of the first light guiding member 52. Accordingly, the light R emitted from the light emitting element 51 is configured to be directed from the one end portion 52a to the other end portion 52b of the first light guiding member 52.

Similar to the first embodiment, the irradiating portions 53 (53a, 53b, and 53c) are provided between the one end portion 52a and the other end portion 52b of the first light guiding member 52.

The irradiating portion 53c, which is the farthest from the light emitting element 51 among the plurality of the irradiating portions 53 (53a, 53b, and 53c), is provided to be adjacent to the other end portion 52b of the first light guiding member 52.

The first light absorbing member 59 is provided at the other end portion 52b of the first light guiding member 52. The first light absorbing member 59 absorbs at least a portion of the light R which is not irradiated from the irradiating portion 53. The first light absorbing member 59 is composed of materials, for example, with higher light absorption rate and lower light transmission rate than those of the first light guiding member 52. For example, synthetic resin containing pigment, rubber, and the like can be used as such materials.

In addition, similar to the first embodiment, the light receiving element 61 is disposed to be adjacent to one end portion 62a in the extending direction D2 of the second light guiding member 62. The light collecting portions 63 (63a, 63b, and 63c) are provided between the one end portion 62a and the other end portion 62b of the second light guiding member 62. Accordingly, the light R let in from the light collecting portions 63 (63a, 63b, and 63c) is configured to be directed from the other end portion 62b to the one end portion 62a of the second light guiding member 62.

The second light absorbing member 69 is provided at the other end portion 62b of the second light guiding member 62. The second light absorbing member 69 absorbs at least a portion of the light R directed from the light collecting portions 63 (63a, 63b, and 63c) to the other end portion 62b. The second light absorbing member 69 is composed of a material similar to that of the first light absorbing member 59.

Similar to the first embodiment, the light receiving element 61 is disposed to be adjacent to the one end portion 62a in the extending direction D2 of the second light guiding member 62. Accordingly, the light R let in from the light collecting portions 63 (63a, 63b, and 63c) is configured to be directed from the other end portion 62b to the one end portion 62a of the second light guiding member 62.

The light collecting portion 63a, which is farthest from the light receiving element 61 among a plurality of the light collecting portions 63 (63a, 63b, and 63c), is disposed to be adjacent to the other end portion 62b of the light guiding member 62.

According to the third embodiment thus configured, the following effects are achieved as well as similar effects to the first embodiment.

Since the first light absorbing member 59 is provided at the other end portion 52b of the first light guiding member 52, at least a portion of the light R, which is not irradiated from the irradiating portions 53 (53a, 53b, and 53c), is absorbed by the first light absorbing member 59. Thus, it is unlikely for the light R to remain in the first light guiding member 52. Therefore, in a case in which the light emitting element 51 does not emit light, the possibility for the light R to be irradiated from the irradiating portion 53 at a timing such that the light emitting element 51 emitted the light can be reduced. As a result, the possibility for malfunctions to occur can be reduced.

In addition, the irradiating portion 53c, which is the farthest from the light emitting element 51 among the plurality of the irradiating portions 53 (53a, 53b, and 53c), is provided to be adjacent to the other end portion 52b of the first light guiding member 52. Therefore, the light R, which is not irradiated at the irradiating portions 53a and 53b other than the irradiating portion 53c provided to be adjacent to the other end portion 52b, is likely to be irradiated from the irradiating portion 53c provided to be adjacent to the other end portion 52b. Thus, it can reduce a possibility for the light R to remain in the first light guiding member 52.

In addition, since the second light absorbing member 69 is provided at the other end portion 62b of the second light guiding member 62, even in a case in which the light R propagates from the light collecting portion 63 (63a, 63b, and 63c) to the other end portion 62b of the second light guiding member 62, the light R is absorbed by the second light absorbing member 69 provided at the other end portion 62b. Thus, it is unlikely for the light R to remain in the second light guiding member 62. Therefore, as a result of the light R being enclosed inside of the second light guiding member 62, the possibility for the light R to be received by the light receiving element 61 with the delayed timing of receiving the light R by the light receiving element 61 can be reduced. As a result thereof, the possibility for malfunctions to occur can be reduced.

In addition, the light collecting portion 63a, which is farthest from the light receiving element 61 among a plurality of the light collecting portions 63 (63a, 63b, and 63c), is disposed to be adjacent to the other end portion 62b of the light guiding member 62. Therefore, even though the light R that is not let in at the light collecting portions 63a and 63b other than the light collecting portion 63c provided to be adjacent to the other end portion 62b of the second light guiding member 62, light can be received at the light collecting portion 63c provided to be adjacent to the other end portion 62b. Thus, a possibility for the light R to remain in the second light guiding member 62 can be reduced particularly in the vicinity of the other end portion 62b.

Figure 12:
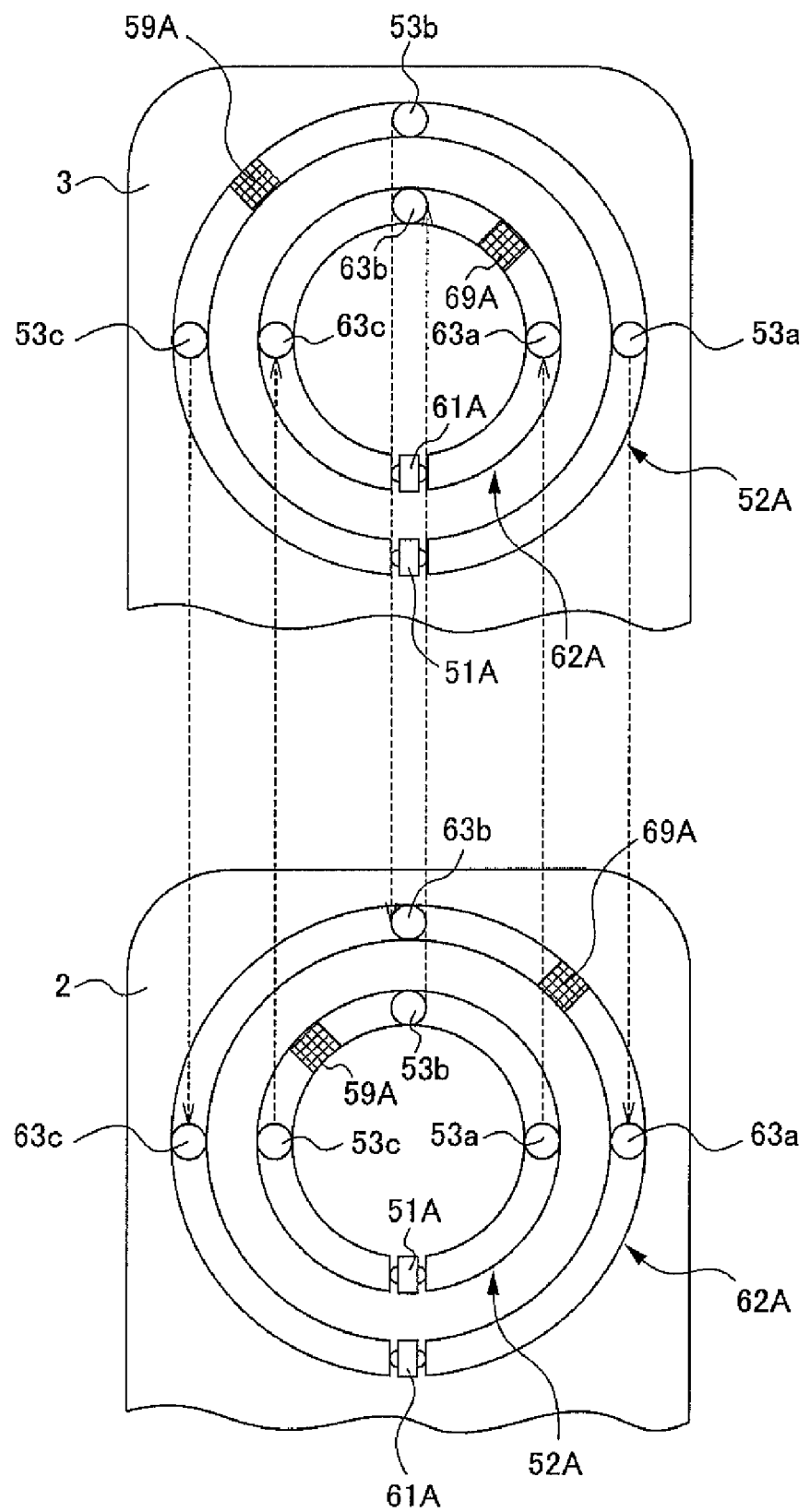
FIG. 12 is an enlarged main component diagram schematically showing a fourth embodiment (corresponding to FIG. 9)

Next, a fourth embodiment having a portion of the configuration thereof that is different from the second embodiment is described with reference to FIG. 12. FIG. 12 is an enlarged main-component diagram schematically showing a fourth embodiment (corresponding to FIG. 9).

The fourth embodiment is mainly different from the second embodiment in that a light emitting element 51A emits a light toward each of the irradiating portions 53a and 53c, which are mutually adjacent, in that the first light guiding member 52 includes a third light absorbing member 59A, and in that the second light guiding member 62 includes a fourth light absorbing member 69A.

Regarding the fourth embodiment, points thereof that are different from the second embodiment are mainly described, and the same reference numerals are assigned to configurations thereof similar to the second embodiment, and the explanations therefor are omitted. Regarding the portions which are not specifically described with respect to the fourth embodiment, the explanations for the second embodiment are applied thereto as appropriate.

As shown in FIG. 12, similarly to the second embodiment, in the fourth embodiment, a set of the light emitting element 51A and the light guiding member 52A and a set of the light receiving element 61A and the light guiding member 62A are provided at the operation unit body 2. Furthermore, a set of the light receiving element 61A and the second light guiding member 62A and a set of the light receiving element 51A and the first light guiding member 52A are provided at the display unit body 3.

As shown in FIG. 12, in the fourth embodiment, the first light guiding member 52A extends substantially in a circular shape, holding the light emitting element 51A. The light emitting element 51A is provided between the irradiating portions 53a and 53c, which are mutually adjacent, and emits a light toward each thereof.

The first light guiding member 52A includes the third light absorbing member 59A between the irradiating portions 53b and 53c, which are mutually adjacent. The third light absorbing member 59A absorbs at least a portion of the light that is emitted from the light emitting element 51A and is not irradiated from the irradiating portion 53.

At least one irradiating portion 53 (53a, 53b, and 53c) is provided between the light emitting element 51A and the third light absorbing member 59A.

In the fourth embodiment, the second light guiding member 62A extends substantially in a circular shape, holding the light receiving element 61A. The light receiving element 61A is provided between the light collecting portions 63a and 63c, which are mutually adjacent, and receives a light from each thereof.

The second light guiding member 62A includes a fourth light absorbing member 69A between the light collecting portions 63a and 63b, which are mutually adjacent. The fourth light absorbing member 69A absorbs at least a portion of the light which is let in from the light collecting portion 63 (63a, 63b, and 63c).

The third light absorbing member 59A and the fourth light absorbing member 69A are composed of a material similar to that of the first light absorbing member 59 and the second light absorbing member 69.

At least one light collecting portion 63 (63a, 63b, and 63c) is provided between the fourth light absorbing member 69A and the light receiving element 61A.

According to the fourth embodiment thus configured, the following effects are achieved as well as the same effects as the second embodiment.

Since the first light guiding member 52A includes the third light absorbing member 59A between the irradiating portions 53b and 53c, which are mutually adjacent, at least a portion of the light which is not irradiated from the irradiating portion 53 (53a, 53b, and 53c) is absorbed by the third light absorbing member 59A. Thus, it is unlikely for the light to remain in the first light guiding member 52A. Therefore, in a case in which the light emitting element 51A does not emit a light, the possibility for the light to be irradiated from the irradiating portion 53 at a timing such that the light emitting element 51 emitted the light can be reduced. As a result thereof, a possibility for malfunctions to occur can be reduced.

In addition, since the second light guiding member 62A includes the fourth light absorbing member 69A between the light collecting portions 63a and 63b, which are mutually adjacent, the light directed from the light collecting portion 63 (63a, 63b, and 63c) to the light receiving element 61A is absorbed by the fourth light absorbing member 69A. Thus, it is unlikely for the light to remain in the second light guiding member 62. Therefore, as a result of the light being enclosed in the second light guiding member 62A, a possibility for the light to be received by the light receiving element 61A with delayed timing of receiving the light by the light receiving element 61A can be reduced. As a result thereof, a possibility for malfunctions to occur can be reduced.

It should be noted that, in the fourth embodiment, although the light emitting element 51A is disposed between the irradiating portions 53 mutually adjacent, holding both of the end portions of the first light guiding member 52A substantially in a circular shape, the present invention is not limited thereto, and the light emitting element 51A may be disposed between the irradiating portions 53 adjacent in an extending direction of the first light guiding member 52A, between the end portions of the first light guiding member 52A. In this case, for example, a cavity may be provided in the first light guiding member 52A, and the light emitting element 51A may be arranged to be in a form embedded in the cavity.

Similarly, in the fourth embodiment, although the light emitting element 61 is disposed between the irradiating units 63 mutually adjacent, holding both the end portions of the second light guiding member 62A substantially in a circular shape, the present invention is not limited thereto, and the light emitting element 61 may be disposed between the light collecting portions 63 adjacent in an extending direction of the second light guiding member 62A, between the end portions of the second light guiding member 62A. In this case, for example, a cavity may be provided in the second light guiding member 62A, and the light emitting element 61 may be arranged to be in a form embedded in the cavity.

Figure 13A:
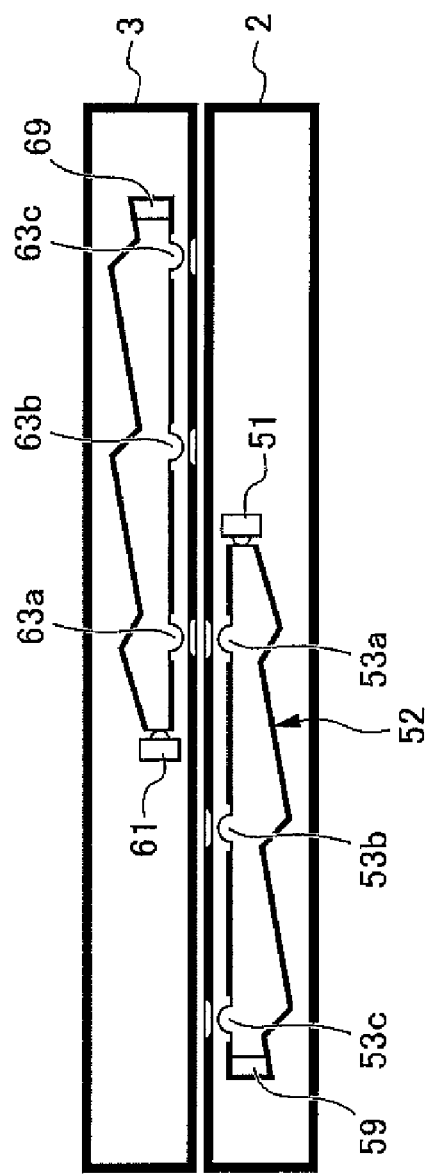
FIGS. 13A and 13B each showing a schematic cross-sectional diagram similar to the FIG. 4, where
Figure 13B:
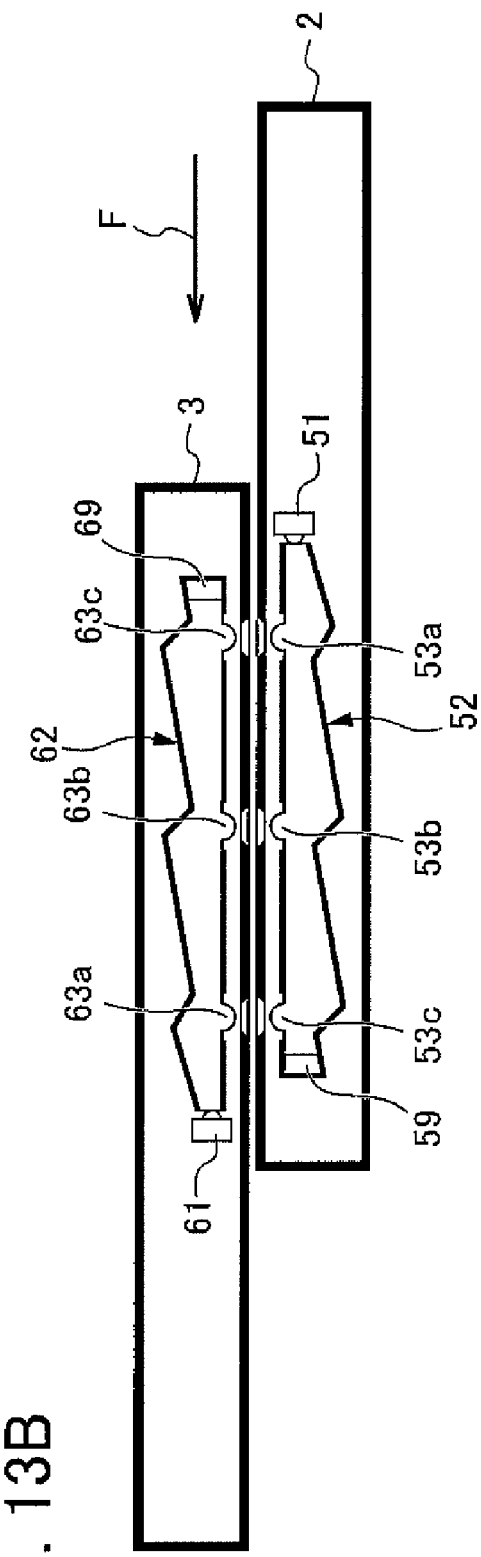

Although the cellular phone 1 of the abovementioned embodiment is a revolver-type, the present invention is not limited thereto, and may be an openable (hinge-type) cellular phone having a display unit body 3 and an operation unit body 2 that are connected to be rotatable (openable) around a rotational axis extending in a width direction thereof. In addition, as shown in FIGS. 13A and 13B, it may be a slider-type cellular phone made so that one body is slid in a direction F from a state in which an operation unit body 2 and a display unit body 3 thereof are superimposed.

The portable electronic device of the present invention can be applied to portable electronic devices other than cellular phones. It should be noted that, for example, a PHS™ (Personal Handy Phone System), a portable game machine, a portable navigation device, a PDA (Personal Digital Assistant), a laptop computer, and an EL display or a liquid crystal display that is equipped with an operation unit can be exemplified as portable electronic devices other than a cellular phone.

What is claimed is:

1. A portable electronic device, comprising:
a first body;
a second body connected with the first body so as to be transformable from a first state in which the second body is superimposed with the first body to a second state, which is different thereto;
a light emitting element that is housed in the first body, and emits light;
a first light guiding member that is housed in the first body, and includes a first propagating path for propagating light emitted from the light emitting element and an irradiating unit for irradiating the light;
a light receiving element that is housed in the second body, and receives light;
a second light guiding member that is housed in the second body, and includes a light collecting portion for letting in light irradiated by the irradiating unit and a second propagating path for propagating light let in from the light collecting portion to the light receiving element; and a complementary location region of the irradiating unit and the light collecting portion that communicates a light signal between the first light guiding member and the second light guiding member in the first state and the second state.

2. The portable electronic device according to claim 1, wherein:
a plurality of the irradiating units and a plurality of the light collecting portions are provided.

3. The portable electronic device according to claim 2, wherein:
the second body is connected to be rotatable around a rotational axis in relation to the first body, and configured so that an angle of rotation of the second body in relation to the first body is held to the first body at a position that substantially makes an integral multiple of a predetermined angle, in a case of rotating the second body around the rotational axis;
each of a plurality of the irradiating units and each of a plurality of the light collecting portions are disposed to be spaced apart substantially at the predetermined angle on a virtual circumference around the rotational axis, respectively; and
the plurality of the irradiating units mutually faces the plurality of the light collecting portions, respectively, in the first state in which the second body is superimposed on the first body.

4. The portable electronic device according to claim 1, wherein:
the first light guiding member comprises a first light transmissive member through which light is transmitted, and a first reflecting unit that reflects light formed surrounding the first light transmissive member; and
the irradiating unit is formed by way of the first light transmissive member being exposed by providing a first opening in the first reflecting unit.

5. The portable electronic device according to claim 4, wherein:
the first reflecting unit comprises a first inclined portion which is inclined toward an extending direction of the first transmissive member so that light emitted from the light emitting element is directed to the irradiating unit; and
the irradiating unit is provided corresponding to the first inclined portion.

6. The portable electronic device according to claim 4, wherein:
the first light transmissive member comprises a first protruding portion which diffuses and irradiates light to a position corresponding to the first opening of the first reflecting unit; and
the irradiating unit is formed from the first protruding portion.

7. The portable electronic device according to claim 1, wherein:
the second light guiding member comprises a second light transmissive member through which light is transmitted, and a second reflecting unit which reflects light formed surrounding the second light transmissive member; and
the light collecting portion is formed by way of the second light transmissive member being exposed by providing a second opening in the second reflecting unit.

8. The portable electronic device according to claim 7, wherein:
the second reflecting unit comprises a second inclined portion which is inclined toward an extending direction of the second transmissive member so that light let in from the light collecting portion is directed to the light receiving element; and
the light collecting portion is provided corresponding to the second inclined portion.

9. The portable electronic device according to claim 7, wherein:
the second light transmissive member comprises a second protruding portion which collects light at a position corresponding to the second opening of the second reflecting unit; and
the light collecting portion is formed from the second protruding portion.

10. A portable electronic device, comprising:
a first body;
a second body connected to the first body to be rotatable around a rotational axis;
a light emitting element that is housed in the first body, and emits light;
a first light guiding member of a circular arc shape, which is housed in the first body, and includes a first propagating path for propagating light emitted from the light emitting element and an irradiating unit for irradiating the light;
a light receiving element that is housed in the second body, and receives light;
a second light guiding member of a circular arc shape, which is housed in the second body, and includes a light collecting portion for letting in light irradiated from the irradiating unit, and a second propagating path for propagating light let in from the light collecting portion to the light receiving element; and
a complementary location region of the irradiating unit and the light collecting portion that communicates a light signal between the first light guiding member and the second light guiding member.

11. The portable electronic device according to claim 1, wherein
the second body is connected to be slidable with the first body in a direction; and
the second state is a state in which the second body is slid with respect to the first body.

12. The portable electronic device according to claim 2, further comprising
at least one of the first light absorbing member, provided in the first light guiding member, for absorbing a portion of the light via the first propagating path and the second light absorbing member, provided at the second light guiding member, for absorbing a portion of the light via the second propagating path.

13. The portable electronic device according to claim 2, wherein:
the light emitting element is provided to be adjacent to an one end portion in an extending direction of the first light guiding member;
light emitted from the light emitting element is directed from the one end portion to another end portion of the first light guiding member through the first propagating path; and
one of a plurality of the irradiating units, which is the farthest from the light emitting element with respect to the first propagating path, is provided to be adjacent to the other end portion of the first light guiding member.

14. The portable electronic device according to claim 12, wherein:
- the light emitting element is provided to be adjacent to one end portion in an extending direction of the first light guiding member;
- the first light absorbing member is provided at the other end portion in an extending direction of the first light guiding member;
- light emitted from the light emitting element is directed from the one end portion to the other end portion of the first light guiding member through the first propagating path; and
- one of a plurality of the irradiating units, which is the farthest from the light emitting element with respect to the first propagating path, is provided to be adjacent to the other end portion of the first light guiding member.

15. The portable electronic device according to claim 2, wherein:
- the light receiving element is provided to be adjacent to an one end portion in an extending direction of the second light guiding member;
- the light let in from the light collecting portion is directed from the other end portion to the one end portion of the second light guiding member through the second propagating path; and
- one of a plurality of the light collecting portions, which is the farthest from the light receiving element with respect to the second propagating path, is provided to be adjacent to the other end portion of the second light guiding member.

16. The portable electronic device according to claim 12, wherein:
- the light receiving element is provided to be adjacent to an one end portion in an extending direction of the second light guiding member;
- the second light absorbing member is provided at another end portion in an extending direction of the second light guiding member;
- light let in from the light collecting portion is directed from the other end portion to the one end portion of the second light guiding member through the second propagating path; and
- one of a plurality of the light collecting portions, which is the farthest from the light receiving element with respect to the second propagating path, is provided to be adjacent to the other end portion of the second light guiding member.

17. The portable electronic device according to claim 2, wherein
the light emitting element is disposed between the irradiating units, which are adjacent, and emits a light toward each of the irradiating units, which are adjacent.

18. The portable electronic device according to claim 12, wherein:
- the first light absorbing member is disposed between the irradiating units, which are adjacent on the first light guiding member; and
- at least one of the irradiating units is provided between the light emitting element and the second light absorbing member.

19. The portable electronic device according to claim 2, wherein:
the light receiving element is disposed between the light collecting portions that are adjacent, and receives light let in from each of the light collecting portions that are adjacent.

20. The portable electronic device according to claim 12, wherein:
- the second light absorbing member is disposed between the light collecting portions that are adjacent on the second light guiding member; and
- at least one of the light collecting portions is provided between the second light absorbing member and the light receiving element.

* * * * *